(12) United States Patent
Shinjo et al.

(10) Patent No.: US 6,563,675 B1
(45) Date of Patent: May 13, 2003

(54) MAGNETIC HEAD UNIT

(75) Inventors: Yasuhiko Shinjo, Yamagata (JP);
Tsuyoshi Ishii, Yamagata (JP); Satoshi Ajiki, Yamagata (JP); Koichi Hosoya, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/644,652

(22) Filed: Aug. 24, 2000

(30) Foreign Application Priority Data

Aug. 26, 1999 (JP) .............................. 11-239710

(51) Int. Cl.$^7$ .............................. G11B 21/16; G11B 5/48
(52) U.S. Cl. .................................................. 360/241.1
(58) Field of Search .......................... 360/241.1, 244.1, 360/245.8, 245.9, 241, 271.9, 264.2, 110, 313, 317, 322, 234.4

(56) References Cited

U.S. PATENT DOCUMENTS

| | | | | |
|---|---|---|---|---|
| 3,975,772 A | * | 8/1976 | Lin | .............................. 360/317 |
| 4,789,914 A | * | 12/1988 | Ainslie et al. | ............ 360/234.4 |
| 4,809,103 A | * | 2/1989 | Lazzari | ......................... 360/110 |
| 5,485,337 A | * | 1/1996 | Sagara | ......................... 360/110 |
| 5,712,747 A | * | 1/1998 | Voldman et al. | .......... 360/234.4 |
| 6,239,947 B1 | * | 5/2001 | Fan et al. | ................. 360/245.9 |
| 6,351,353 B1 | * | 2/2002 | Sluzewski et al. | ........ 360/234.5 |
| 6,356,413 B2 | * | 3/2002 | Coon et al. | .............. 360/244.1 |
| 6,400,529 B1 | * | 6/2002 | Baba et al. | ............... 360/234.4 |

FOREIGN PATENT DOCUMENTS

JP  10-124839  5/1998

* cited by examiner

Primary Examiner—A. J. Heinz
Assistant Examiner—Julie Anne Watko
(74) Attorney, Agent, or Firm—Whitham, Curtis & Christofferson, P.C.

(57) ABSTRACT

A pattern of lead terminals 22 is formed on a side face of a head body 4 provided with reproduction magnetic heads 9 each being formed with a magnetic gap 11 for reproducing at least an information signal, etc., recorded on a magnetic recording medium, and a preamplifier 6 for amplifying reproduction output detected by the magnetic gap 11 via the lead terminal 22 is mounted directly on the side face of the head body 4.

7 Claims, 3 Drawing Sheets

MAGNETIC HEAD UNIT

BACKGROUND OF THE INVENTION

This invention relates to a magnetic head unit installed in a magnetic recording and reproduction apparatus for recording information signals, etc., on a loaded magnetic recording medium or reproducing recorded information signals, etc.

A magnetic recording and reproduction apparatus such as a magnetic tape unit, a floppy disk drive, or a hard disk drive is provided with a magnetic head unit for recording information signals, etc., on a loaded magnetic recording medium such as magnetic tape, a floppy disk, or a hard disk or reproducing recorded information signals, etc. Hitherto, various types of magnetic head units have been provided; a multi-channel type hybrid magnetic head unit 50, for example, shown in FIG. 5 is provided as a magnetic head unit compatible with high-density recording. The hybrid magnetic head unit 50 comprises a head block 52 and a support block 53 joined on the whole via a nonmagnetic insulating layer 51 and a flexible wiring board 54 joined at one end to the head block 52.

The hybrid magnetic head unit 50 has an upper end face forming a rounded working face to be abutted against a magnetic recording medium, and is also formed with a large number of magnetic heads 55 arranged in parallel with the running direction of the magnetic recording medium. The nonmagnetic insulating layer 51 is made of aluminum oxide ($Al_2O_3$), etc., for example, and is formed as a film on one side of the head block 52. The head block 52 and the support block 53 are formed of nonmagnetic material or magnetic material of alumina, titanium carbide, etc., having a suitable wear resistance or running characteristic.

The hybrid magnetic head unit 50 is formed with a pattern of a plurality of lead terminals 56 drawn out from the magnetic heads 55 on a side of the head block 52 and in particular on the nonmagnetic insulating layer 51 formed as a film on the head block 52. The flexible wiring board 54 is formed at one end part with a plurality of electrode terminals 57 in a one-to-one correspondence with the lead terminals 56. The electrode terminals 57 of the flexible wiring board 54 are connected electrically and mechanically to the corresponding lead terminals 56 with a conductive adhesive, by soldering, etc., for example.

The hybrid magnetic head unit 50 supplies an electric current corresponding to an information signal, etc., to each magnetic head 55 via the flexible wiring board 54 or takes out reproduction output corresponding to an information signal, etc., detected by each magnetic head. A preamplifier 58 (not described in detail) is connected to an opposite end of the flexible wiring board 54, whereby the hybrid magnetic head 50 amplifies reproduction output and transmits the same to a main body unit for signal processing.

Each magnetic head 55, although not described in detail, is made up of a recording head and a reproduction head. The recording head is implemented as an inductive type magnetic head manufactured by executing a thin film process, for example. The reproduction head is implemented as a magnetoresistance effect type magnetic head (MR magnetic head) having a magnetoresistance effect element (MR element) manufactured by executing a thin film process, for example. The MR magnetic head comprises electrodes attached to both ends of the MR element having a magnetoresistance effect film with resistance changing depending on the magnitude of a magnetic field. The MR magnetic head supplies a sense current from the electrodes to the MR element, thereby detecting magnetic field change based on an information signal, etc., recorded on a recording medium as resistance change of the MR element and providing reproduction output. As compared with an induction type reproduction magnetic head, the MR magnetic head features the capability of providing a high output voltage, output independent of the relative speed with a recording medium, and the like.

In the magnetic recording and reproduction apparatus, a high capacity and speeding up are planned by various methods and magnetic recording media of magnetic tape, floppy disks, etc., are also intended accordingly for narrow tracks, etc., in response to high-density recording of information signals, etc. The magnetic head unit makes it possible to provide reproduction output of comparatively large information signals, etc., also from magnetic recording media designed as the high-density recording specifications by using the hybrid magnetic head unit 50.

By the way, the magnetic recording and reproduction apparatus is also intended for recording a record information signal, etc., in a high frequency band on a magnetic recording medium with high-density recording. The magnetic recording and reproduction apparatus provides reproduction output of the information signals, etc., recorded by the magnetic heads 55 of the hybrid magnetic head unit 50 as described above. The hybrid magnetic head unit 50 transmits an extremely weak signal detected by the magnetic head 55 to the preamplifier 58 via the flexible wiring board 54. Thus, in the magnetic heads 55, the extremely weak signal of a high frequency band component detected by the magnetic head 55 is attenuated on a transmission path and a large loss is produced, making it impossible to reproduce the signal with high accuracy.

SUMMARY OF THE INVENTION

It is therefore an object of the invention to provide a magnetic head unit for recording and reproducing also an information signal, etc., of a high frequency band component with high accuracy by efficiently amplifying extremely weak reproduction output detected by a magnetic head with a loss on a transmission path suppressed.

In order to achieve the above object, according to the present invention, there is provided a magnetic head unit comprising:

a head body including a magnetic reproduction head provided with a magnetic gap for reproducing at least information signal recorded on a magnetic recording medium;

a lead terminal formed on a side face of the head body and connected with the magnetic reproduction head; and a preamplifier directly mounted on the side face of the head body, for amplifying a reproduction output from the magnetic gap via the lead terminal.

According to the present invention, there is also provided a magnetic head unit comprising:

a head body including a magnetic reproduction head provided with a magnetic gap for reproducing at least information signal recorded on a magnetic recording medium;

a lead terminal formed on a side face of the head body and connected with the magnetic reproduction head;

a flexible wiring board one end portion of which is connected with the lead terminal; and a preamplifier directly mounted on the end portion of flexible wiring board, for amplifying a reproduction output from the magnetic gap via the lead terminal.

According to the magnetic head unit according to the invention thus configured, the reproduction output detected by the magnetic gap is amplified by the preamplifier placed at a position near the magnetic gap, so that the loss on the transmission path of the flexible wiring board, etc., can be minimized. Therefore, the magnetic head unit records and reproduces, with higher accuracy, also the information signal, etc., of a high frequency band component accompanying high-density recording, such as an information signal, etc., on a magnetic recording medium.

DETAILED DESCRIPTION OF THE PREFERRED EMBODIMENTS

Figure 1:
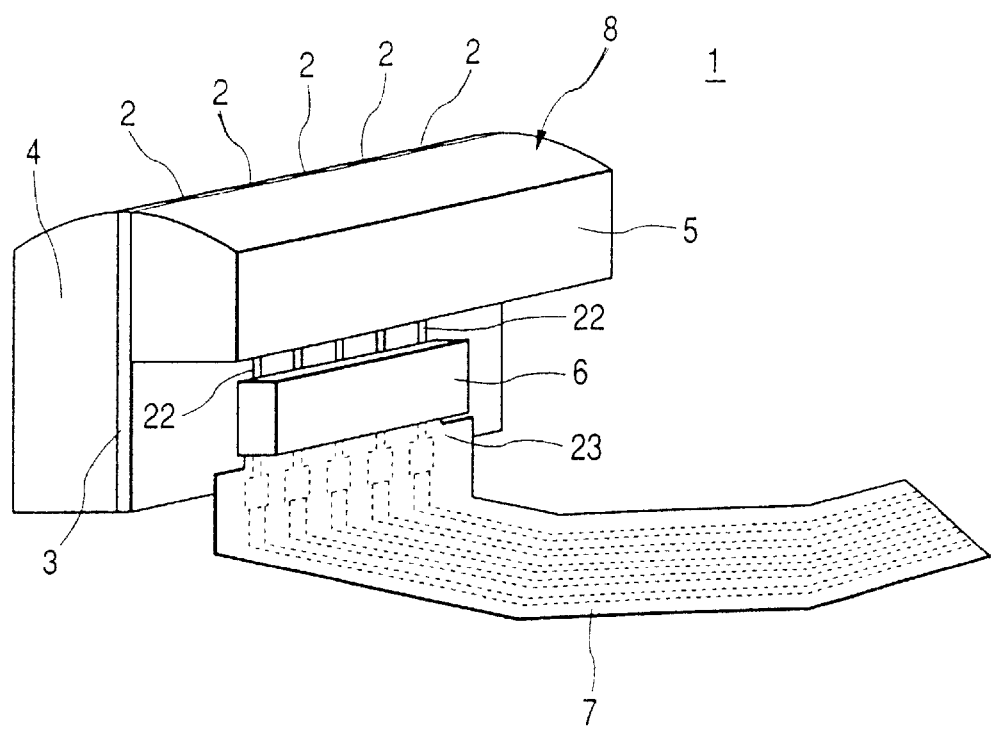
FIG. 1 is a perspective view of a multi-channel hybrid magnetic head unit according to a first embodiment of the invention.

Referring now to the accompanying drawings, there are shown preferred embodiments of the invention. A magnetic head unit shown in the drawings as a first embodiment is also a multi-channel type hybrid magnetic head unit 1 compatible with high-density recording, which has a basic configuration similar to that of the above-described hybrid magnetic head unit 50 and comprises a nonmagnetic insulating layer 3 formed with a large number of magnetic heads 2 (described later in detail), sandwiched between a head block 4 and a support block 5 in one piece. The hybrid magnetic head unit 1 has a preamplifier 6 mounted directly on the head block 4 and a flexible wiring board 7 joined at one end to the preamplifier 6 although described later in detail.

Figure 3:
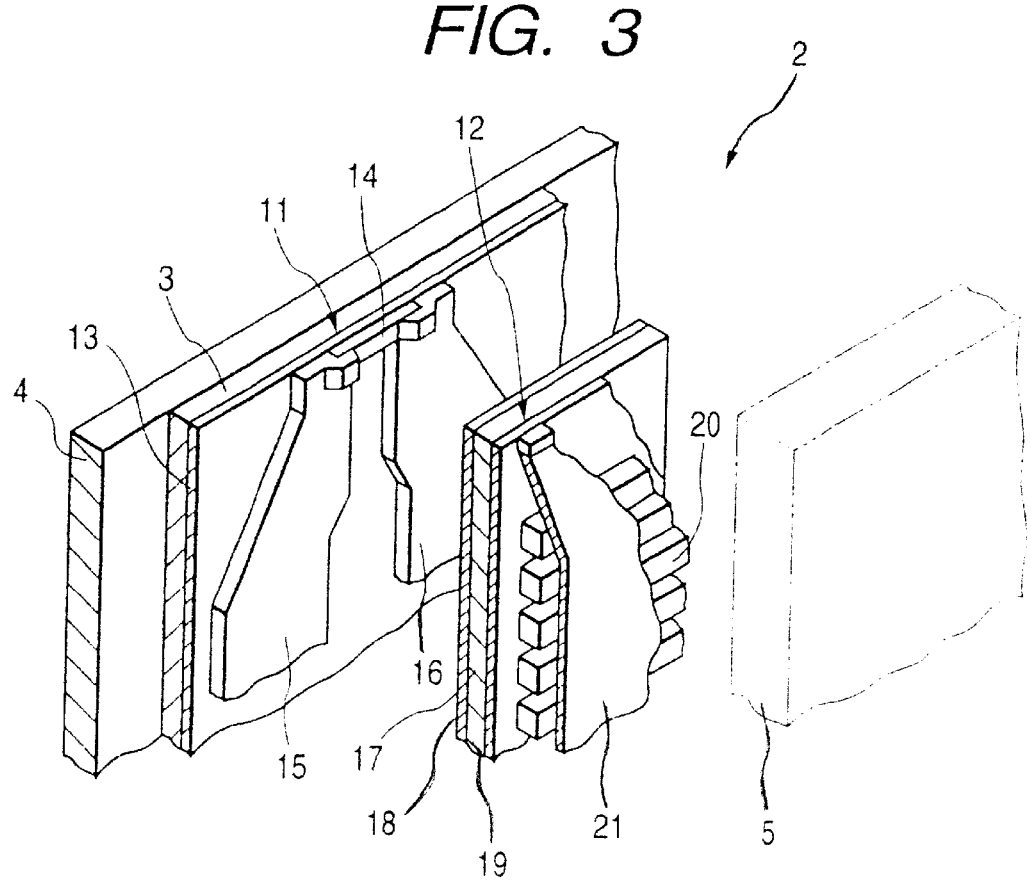
FIG. 3 is an exploded perspective view of the main part to show the configuration of the head of the hybrid magnetic head unit in FIG. 1.

As shown in FIGS. 1 and 3, the hybrid magnetic head unit 1 has an upper end face forming a rounded working face 8 to be abutted against a magnetic recording medium, and also has the magnetic heads 2 arranged adjacent to each other in parallel with the running direction of the magnetic recording medium. Each magnetic head 2 comprises a MR magnetic reproduction head 9 and a thin-film magnetic recording head 10, and a read gap 11 and a write gap 12 are formed on the working face 8 of the nonmagnetic insulating layer 3. The nonmagnetic insulating layer 3 is made of aluminum oxide ($Al_2O_3$), etc., for example, and is formed as a film on one side of the head block 4 and the magnetic heads 2 are buried in the nonmagnetic insulating layer 3 by executing a thin film process.

The head block 4 and the support block 5 are formed of nonmagnetic material or magnetic material of alumina, titanium carbide, etc., having a suitable wear resistance or running characteristic. The head block 4 and the support block 5 are formed in width dimensions necessary and sufficient for mechanically protecting and holding the nonmagnetic insulating layer 3 and running a magnetic recording medium in a stable state.

The magnetic heads 2 will be discussed in detail with reference to FIGS. 2 and 3. Each magnetic head 2 consists of the MR magnetic reproduction head 9 and the thin-film magnetic recording head 10 deposited in the nonmagnetic insulating layer 3 formed as a film on the head block 4 and arranged in the running direction of a magnetic recording medium. The MR magnetic reproduction head 9 is made up of a first shield 13 formed as a film on the nonmagnetic insulating layer 3, an MR element 14 placed at a position corresponding to the working face 8 of the first shield 13 with a magnetic recording medium, a pair of electrodes 15 and 16 formed as a film on the first shield 13 for connecting both ends of the MR element 14, and a second shield 17 formed as a film on the first shield 13 so as to cover the MR element 14 and the electrodes 15 and 16. The second shield 17 is formed on an opposed face to the first shield 13 with an insulating layer 18 as a film and is also formed on the main face on the opposite side with an insulating layer 19 as a film. The MR magnetic reproduction head 9 comprises the read gap 11 formed corresponding to the MR element 14.

The thin-film magnetic recording head 10 consists of a large number of coil layers 20 formed as thin films on the insulating layer 19 on the opposite side to the second shield 17 of the MR magnetic reproduction head 9 described above as a first magnetic layer and a second magnetic layer 21 formed so as to cover the coil layers 20. The thin-film magnetic recording head 10 has the first magnetic layer 17 and the second magnetic layer 21 opened on the side corresponding to the running face of a magnetic recording medium, forming a write gap 12, and is short-circuited on the side opposed to the write gap 12.

Figure 2:
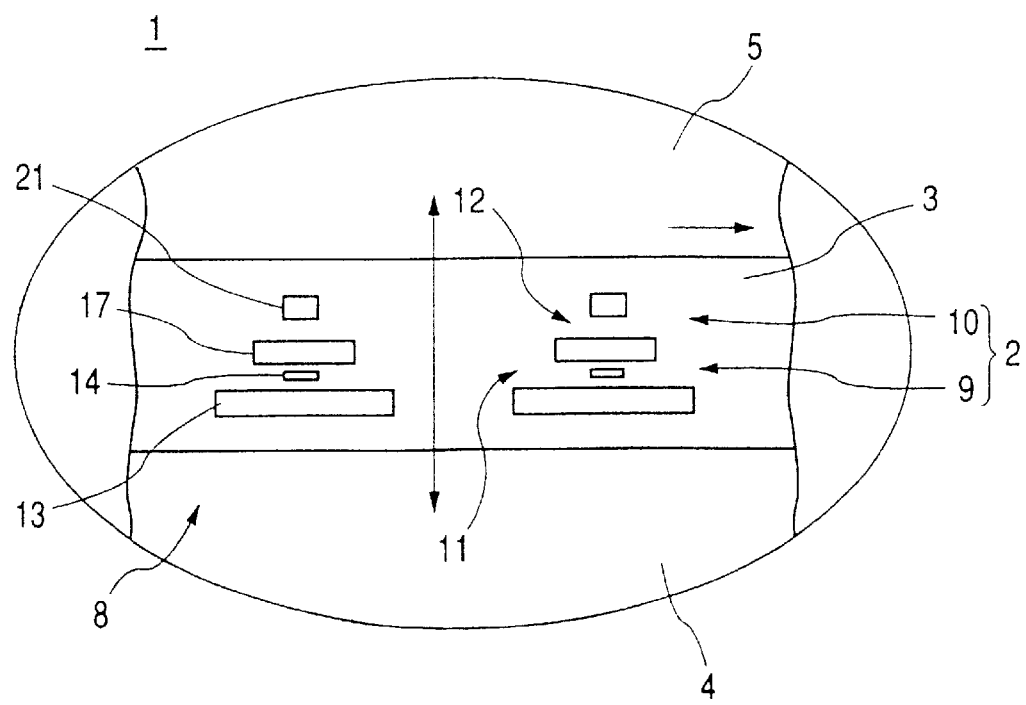
FIG. 2 Is a plan view of the main part to show the configuration of a head of the hybrid magnetic head unit in FIG. 1.

The described magnetic head 2 reproduces recorded information signals, etc., by the MR magnetic reproduction head 9 on a magnetic recording medium running along the working face of the nonmagnetic insulating layer 3 as indicated by the arrow in FIG. 2. The magnetic head 2 records information signals, etc., by the thin-film magnetic recording head 10 on a magnetic recording medium running along the working face of the nonmagnetic insulating layer 3. The magnetic head 2 produces reproduction output based on the information signal, etc., reproduced by the MR magnetic reproduction head 9 via the flexible wiring board 7. An input signal of the information signal, etc., to be recorded by the thin-film magnetic recording head 10 to the magnetic head 2 via the flexible wiring board 7.

The flexible wiring board 7 is connected to the hybrid magnetic head unit 1 via the preamplifier 6 as described above. As shown in FIG. 1, the hybrid magnetic head unit 1 Is formed with lead terminals 22 drawn out from the MR magnetic reproduction heads 9 and the thin-film magnetic recording heads 10 of the magnetic heads 2 described above. In the MR magnetic reproduction head 9, the electrodes 15 and 16 are extended along the main face of the nonmagnetic insulating layer 3, whereby the extension end part is formed as the lead terminal 22. In the thin-film magnetic recording head 10, the first magnetic layer 17 and the second magnetic layer 21 are extended along the main face of the nonmagnetic insulating layer 3, whereby the extension end part is formed as the lead terminal 22. In FIG. 1, the lead terminals 22 are as a plurality of single terminals in a one-to-one correspondence with the magnetic heads 2, but each lead terminal 22 comprises a plurality of discrete signal lines described above.

Each lead terminal 22 is extended to the lower area of the head block 4 to which the support block 5 is not joined as shown in FIG. 1 and a connection terminal is formed at an end part of the lead terminal 22 in one piece although not shown. The hybrid magnetic head unit 1 has the preamplifier 6 mounted directly on one side of the head block 4. The preamplifier 6 is formed with a plurality of connection terminals (not shown) in a one-to-one correspondence with the connection terminals and is mounted directly on the side of the head block 4 by electrically and mechanically connecting the corresponding connection terminals by soldering, with a conductive adhesive, or the like.

The preamplifier 6 Is formed on one side with a terminal connection opening (not described in detail) into which a connection part 23 formed at one end part of the flexible wiring board 7 is fitted. In the hybrid magnetic head unit 1, the electrodes 15 and 16 of the MR magnetic reproduction head 9 are connected to an internal processing circuit of the preamplifier 6 and the first magnetic layer 17 and the second magnetic layer 21 of the thin-film magnetic recording head 10 are placed in a through state for connecting the lead terminals 22 and leads of the flexible wiring board 7. The flexible wiring board 7 is connected at an opposite end part to a signal processing circuit section of the main body unit (not shown).

When a magnetic recording medium is run in a state in which a sense current is supplied to the MR element 14 via the electrodes 15 and 16 of the MR magnetic reproduction head 9 based on a reproduction command, the described hybrid magnetic head unit 1 reproduces the information signals, etc., recorded on the magnetic recording medium. In the hybrid magnetic head unit 1, in the MR magnetic reproduction head 9, a signal magnetic field based on the information signal, etc., recorded on the magnetic recording medium causes resistance change to occur in the MR element 14 and extremely weak current change produced accordingly is reproduced and output. The hybrid magnetic head unit 1 amplifies the reproduction output by the preamplifier 6 and transmits it to the signal processing circuit section of the main body unit via the flexible wiring board 7.

In the hybrid magnetic head unit 1, the preamplifier 6 is placed at a part near the read gap 11 of the MR magnetic reproduction head 9 as described above. The hybrid magnetic head unit 1 amplifies a signal by the preamplifier 6 without a large loss caused by attenuation on the transmission path between the preamplifier 6 and the read gap 11. Therefore, the hybrid magnetic head unit 1 can also produce, with high accuracy, extremely weak reproduction output based on the information signals, etc., recorded at high density In a high frequency band on a magnetic recording medium.

Figure 4:
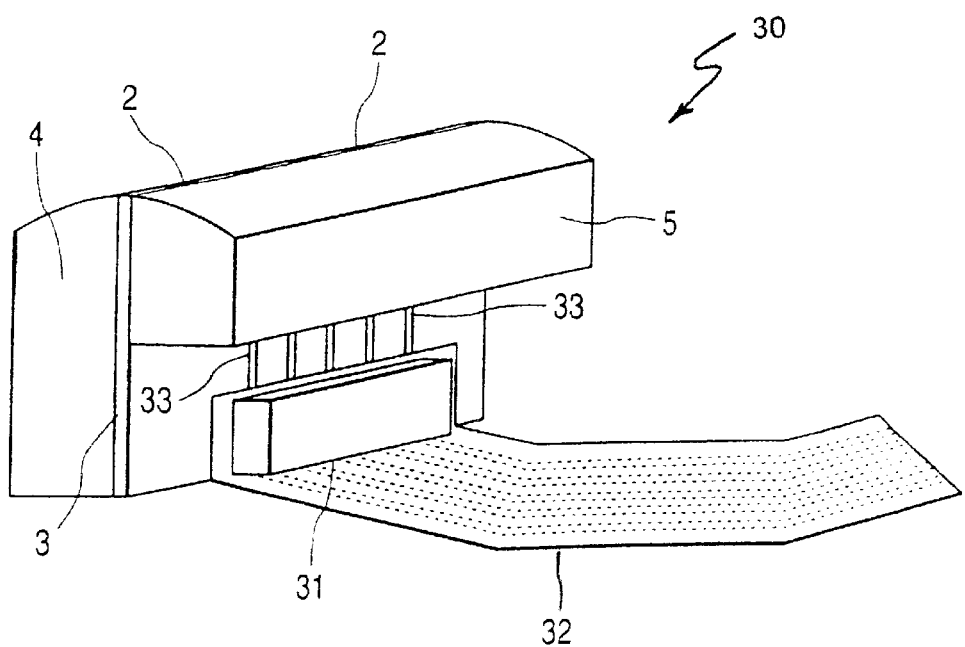
FIG. 4 is a perspective view of a multi-channel hybrid magnetic head unit according to a second embodiment of the invention.
Figure 5:
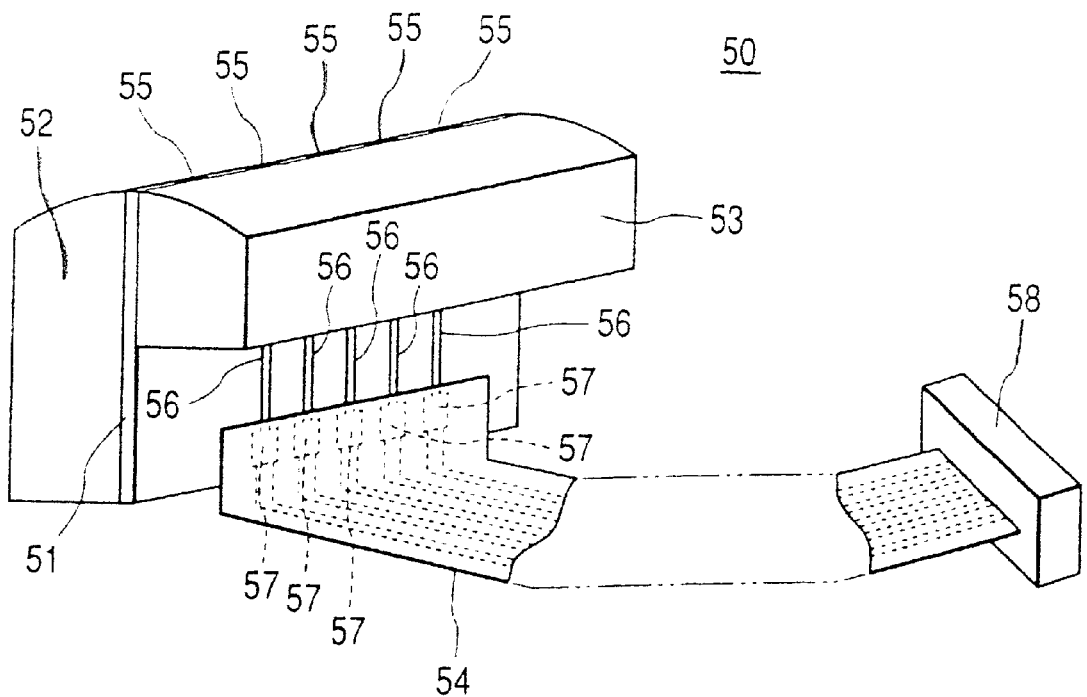
FIG. 5 is a perspective view of a related multi-channel hybrid magnetic head unit

A hybrid magnetic head unit 30 shown in FIG. 4 as a second embodiment of magnetic head unit according to the invention has a basic configuration similar to that of the above-described hybrid magnetic head unit 1 and features the configuration in which a preamplifier 31 is mounted on a head block 4 via a flexible wiring board 32. That is, in the hybrid magnetic head unit 30, lead terminals 33 are also drawn out from MR magnetic reproduction heads 9 and thin-film magnetic recording heads 10 of magnetic heads 2 and are formed in the lower area of the head block 4 to which a support block 5 is not joined along the main face of a nonmagnetic insulating layer 3.

In the hybrid magnetic head unit 30, corresponding connection terminals are electrically and mechanically connected to the lead terminals 33 by soldering, with a conductive adhesive, or the like, whereby one end of the flexible wiring board 32 is connected. The preamplifier 31 is installed on an opposite side of the flexible wiring board 32 corresponding to the connection parts to the lead terminals 33. The preamplifier 31 is formed with a plurality of connection terminals (not shown) in a one-to-one correspondence with the connection terminals formed on the flexible wiring board 32 and is mounted directly on the side of the flexible wiring board 32 by electrically and mechanically connecting the corresponding connection terminals by soldering, with a conductive adhesive, or the like.

In the hybrid magnetic head unit 30, electrodes 15 and 16 of the MR magnetic reproduction head 9 are connected to an internal processing circuit of the preamplifier 31 via the connection terminals of the lead terminals 33 and the connection terminals of the flexible wiring board 32. In the hybrid magnetic head unit 30, the electrodes 15 and 16 of the MR magnetic reproduction head 9 are connected to signal lines of the flexible wiring board 32 via output terminals of the preamplifier 31. In the hybrid magnetic head unit 30, a first magnetic layer 17 and a second magnetic layer 21 of the thin-film magnetic recording head 10 are connected to the signal lines of the flexible wiring board 32 in a through state relative to the preamplifier 31.

In the hybrid magnetic head unit 30, the preamplifier 31 is placed at a part near a read gap 11 of the MR magnetic reproduction head 9 although the flexible wiring board 32 is involved. The hybrid magnetic head unit 30 amplifies a signal by the preamplifier 31 without a large loss caused by attenuation on the transmission path between the preamplifier 31 and the read gap 11. Therefore, the hybrid magnetic head unit 30 can also produce; with high accuracy, extremely weak reproduction output based on the information signals, etc., recorded at high density in a high frequency band on a magnetic recording medium.

Although the multi-channel type hybrid magnetic head units each comprising a large number of magnetic heads 2 each consisting of the MR magnetic reproduction head 9 and the thin-film magnetic recording head 10 have been shown as the embodiments, but the invention is not limited to the hybrid magnetic head units. The magnetic head unit may be a reproduction-only magnetic head unit comprising only the MR magnetic reproduction heads 9, for example, needless to say. In the above-described embodiment, the nonmagnetic insulation layer formed on the side of the head block 4 is formed with the lead terminals 23 and the preamplifier 6 or the flexible wiring board 7 is connected to the lead terminals 23, but the head block 4, etc., may be formed directly with the lead terminals, needless to say.

As described above in detail, according to the magnetic head unit according to the invention, the preamplifier placed at a position near the magnetic gap amplifies an extremely weak signal current based on reproduction output detected by the magnetic gap with the loss on the transmission path minimized, so that the information signal, etc., can be recorded and reproduced with high accuracy. Therefore, according to the magnetic head unit, the information signals, etc., in a high frequency band can be recorded and reproduced with high accuracy also for narrow tracks and multi-channels of a recording medium as the information signals, etc., are recorded at high density accompanying a large capacity.

What is claimed is:

1. A magnetic head unit comprising:

a head body;

a support body;

a plurality of magnetic reproduction heads, each provided with a magnetic gap for reproducing at least information signal recorded on a tape-shaped magnetic recording medium, the magnetic reproduction heads being held between the head body and the support body;

a plurality of lead terminals, each formed on a side face of said head body and connected with one of the magnetic reproduction heads;

a flexible wiring board provided on said side face of the head body; and a preamplifier mounted on said side face of said head body and electrically connected to said lead terminals and the flexible wiring board, for amplifying a reproduction output from each magnetic gap.

2. The magnetic head unit as set forth in claim 1 wherein the preamplifier is directly connected to the lead terminal.

3. The magnetic head unit as set forth in claim 2 wherein the magnetic reproduction head is provided as a magnetoresistance effect type magnetic head including a magnetoresistance effect element.

4. The magnetic head unit as set forth in claim 3 wherein a thin-film magnetic recording head manufactured by a thin-film process is mounted on the head body so as to be adjacent to the magnetic reproduction head.

5. The magnetic head as set forth in claim 1, wherein one end portion of the flexible wiring board is directly connected with said lead terminal; and wherein the preamplifier is directly mounted on the end portion of said flexible wiring board.

6. The magnetic head unit as set forth in claim 5 wherein the magnetic reproduction head is provided as a magnetoresistance effect type magnetic head including a magnetoresistance effect element.

7. The magnetic head unit as set forth in claim 6 wherein a thin-film magnetic recording head manufactured by a thin-film process is mounted on the head body so as to adjacent the magnetic reproduction head.

* * * * *